Patented Sept. 29, 1942

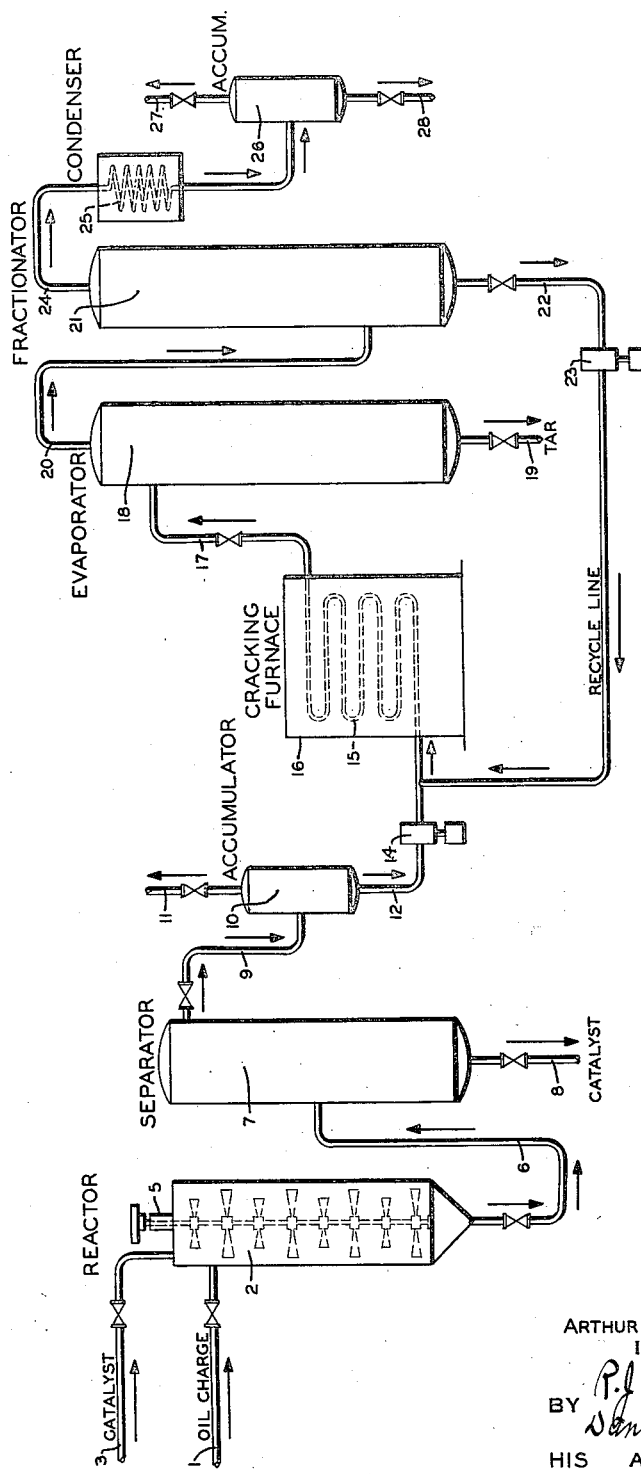

2,297,617

UNITED STATES PATENT OFFICE 2,297,617

CONVERSION OF HYDROCARBON OILS

Arthur R. Goldsby, Beacon, N. Y., assignor, by mesne assignments, to The Texas Company, New York, N. Y., a corporation of Delaware Application January 31, 1940, Serial No. 316,464

4 Claims. (Cl. 196—50)

This invention relates to the conversion of hydrocarbon oils and has to do particularly with the cracking of higher boiling hydrocarbon oils into lower boiling products, such as gasoline.

More particularly, the invention comprises a process in which a virgin oil, such as a paraffinic stock essentially free of unsaturates, is treated to alter the character of the paraffin hydrocarbon constituents by isomerization or rearrangement of the structure thereof to a form which is more desirable in a cracking stock and then the treated oil is subjected to conversion whereby products of improved antiknock value are obtained.

Stocks essentially free of unsaturates and normally producing an inferior grade of gasoline may be treated prior to cracking with anhydrous metallic halides whereby straight chain paraffin hydrocarbon constituents thereof are isomerized to branch chain hydrocarbons of substantially the same boiling range, and the resulting product on cracking produces a cracked distillate showing a much improved antiknock value.

Hydrocarbon oils used as cracking stocks have been treated, heretofore, with metallic halides but the treatment has been such that no appreciable amount of isomerization would be obtained. Thus oils have been treated with metallic halides to obtain cracking of the oils, under high temperatures which are unsuitable for isomerization. Also oils to be cracked have been mixed at atmospheric temperatures with the metallic halides preliminary to the cracking, but the time of reaction has been insufficient to obtain isomerization and unsaturated hydrocarbons have been present in amounts which render the catalyst ineffective for isomerization.

The process of the invention is preferably carried out in two steps. In the first step the virgin charging stock is isomerized by treating under proper conditions with a suitable catalyst to effect transformation of straight chain into branch chain paraffin hydrocarbons. One type of catalyst which may be used is the metallic halides. Anhydrous aluminum halides such as aluminum bromide and aluminum chloride have been found satisfactory, although other catalysts are intended to be included. The amount of catalyst usually ranges between about 5 and 20% by weight of the oil treated. The presence of an hydrogen halide is also desirable, and I prefer to use about 0.5 to 3% of hydrogen chloride or hydrogen bromide, in addition to the aluminum chloride or aluminum bromide.

The conditions for treatment with the isomerization catalyst may vary considerably and will depend on the nature of the oil. Temperatures of about 75–400° F. may be used. The higher temperatures may be used on more refractory stocks and when it is desired to speed up the reaction, I prefer, particularly with aluminum chloride, to use temperatures of about 200–275° F. The time will depend on the temperature. From 1 to 10 hours for example, may be sufficient at the higher temperatures. When working at temperatures of about 75–80° F. from 10 to 40 hours, approximately, will be required. Sufficient pressure is necessary only to keep the material in the liquid phase. For ordinary cracking stocks atmospheric pressure may be used.

At the higher temperatures, considerable gas formation may occur, but this is largely isobutane which is valuable for use in other processes, such as alkylation, dehydrogenation, etc.

In the second step the isomerized product is subjected to cracking. The cracking operation may be either thermal or catalytic and any well known or preferred method may be used. If thermal cracking is used, the conventional conditions are about 200–1000 pounds pressure and 750–1100° F. Good results are obtained at about 400 pounds and about 900° F. when cracking gas oils. For catalytic cracking the temperature and pressure conditions may be somewhat less severe. Catalysts such as aluminum chloride, solid adsorptive catalysts alone or impregnated with various metallic oxides may be used. Temperatures of about 400–1000 F. may be used and pressures from 100–750 pounds. Thermal cracking is ordinarily satisfactory although in some cases catalytic cracking, particularly with AlCl₃ at about 400–700° F. is preferable.

The drawing shows a diagrammatic sketch of one form of apparatus for carrying out the process of the invention.

Referring to the drawing, the oil to be treated is introduced through the line 1 into a reaction vessel 2. The catalyst is introduced through the line 3 as a suspension in oil or as a hydrocarbon complex. The catalyst may be charged as a mixture with the feed oil or as a solid through means other than a line, for example a funnel (not shown). In the reactor the oil is intimately contacted with the catalyst by a stirrer 5. The reaction products are transferred through the line 6 to a separator 7 wherein the catalyst is separated from the oil and discharged through the line 8. The hydrocarbons are passed through the line 9 to an accumulator 10. All or a portion of the normally gaseous hydrocarbons may be released from the accumulator through the line 11. The liquid products are withdrawn from the bottom of the accumulator through the line 12 by pump 14 and passed through the heating coil 15, located in a cracking furnace 16. The cracked products are discharged through the line 17 into an evaporator 18 wherein vapors and tar are separated. The tar is withdrawn from the bottom of the separator through the line 19. The vapors are conducted through the line 20 to a fractionator 21 and therein fractionated to separate a recycle stock of higher boiling range than gasoline which is recycled through the line 22 by the pump 23 to the coil 15. The uncondensed vapors are led from the top of the fractionator through the line 24 and condenser 25. A gasoline condensate is collected in an accumulator 26 equipped with a gas release line 27 and a liquid draw-off line 28.

According to one method of operation the isomerization and cracking may be carried out with the same catalyst or a mixture of catalysts comprising the isomerization catalyst. For example the isomerization may be carried out at a low temperature with aluminum bromide and then the cracking operation conducted at a higher temperature with the same catalyst. When using aluminum bromide it is sometimes advantageous to separate at least a portion of the aluminum bromide for recycling, and add to the resulting product additional aluminum bromide and then subject the mixture to cracking conditions.

As an example of the operation of the invention, a virgin gas oil charging stock is mixed with about 10% aluminum bromide. The mixture is agitated for about 40 hours at a temperature of about 75° F. The aluminum bromide and any sludge is separated and the treated oil subjected to cracking at about 875° F. and about 600 pounds. The anti-knock value of the gasoline obtained is about 2–5 points higher than ordinarily obtained without the isomerization treatment.

As another example of the operation of the invention, a virgin gas oil is agitated with 20% aluminum chloride for about 2 hours at around 250° F. The catalyst is separated and the treated oil subjected to thermal cracking at about 950° F. under about 400 pounds pressure. The anti-knock value of the cracked gasoline is about 2 to 6 points higher than the gasoline produced by similar cracking of the gas oil which had not been given the isomerization treatment.

While the above examples relate to the cracking of virgin gas oil, it is to be understood that other oils may be used, which are essentially free of unsaturates.

The invention is also applicable to the reforming of straight run naphtha, in which the naphtha is subjected to isomerization as herein described prior to subjecting the same to the reforming operation.

For example, a straight run naphtha having a boiling range of about 280° to 400° F. and an octane number of 26 was treated with 20% aluminum chloride and about 0.8% of hydrogen chloride for 3 hours at 260° F. Tht treated naphtha had an octane number of about 47. On subjecting the treated naphtha to thermal reforming, a gasoline may be obtained having an octane number of about 5 to 10 points higher than the gasoline obtained by reforming to a similar yield the same naphtha which has not received the preliminary isomerization treatment.

The advantages of the present invention appear to be due to the formation, in the isomerization step, of branched chain compounds which on cracking yield high anti-knock products. However, the invention is not dependent on any theory of reaction.

This application is a continuation-in-part of my pending application Serial No. 151,173, filed June 30, 1937.

Obviously many modifications and variations of the invention, as hereinbefore set forth, may be made without departing from the spirit and scope thereof, and therefore only such limitations should be imposed as are indicated in the appended claims.

I claim:

1. A process for the manufacture of high antiknock motor fuel hydrocarbons from a saturated hydrocarbon feed rich in straight chain hydrocarbons which comprises subjecting said hydrocarbons, in the substantial absence of unsaturated hydrocarbons, to the action of an isomerization catalyst maintained under isomerizing conditions such that substantial conversion of straight chain hydrocarbons into branched chain hydrocarbons of substantially the same boiling range occurs as the predominating reaction, separating the isomerized hydrocarbons from the catalyst, subjecting the isomerized hydrocarbons to cracking at a temperature elevated substantially above the temperature prevailing during the aforesaid isomerization reaction, whereby substantial conversion into high antiknock gasoline hydrocarbons is obtained, fractionating the cracked mixture to separate it into relatively low and relatively high boiling fractions respectively, the low boiling fraction being rich in high antiknock gasoline hydrocarbons, withdrawing said low boiling fraction, commingling said higher boiling fraction with isomerized feed oil in the substantial absence of said isomerization catalyst, and passing the commingled mixture to said cracking reaction.

2. The method according to claim 1 in which the isomerization catalyst comprises metallic halide and hydrogen halide and the isomerization reaction is effected at a temperature in the range about 75 to 400° F.

3. A process for the manufacture of high antiknock motor fuel hydrocarbons from saturated gas oil hydrocarbons which comprises subjecting said gas oil, in the substantial absence of unsaturated hydrocarbons, to the action of an anhydrous metallic halide isomerization catalyst, effecting the action in the presence of a small amount of hydrogen halide at a temperature in the range about 75 to 400° F. such that substantial conversion of straight chain hydrocarbons into branched chain hydrocarbons of substantially the same boiling range occurs as the predominating reaction, separating the isomerized hydrocarbons from the catalyst, subjecting the isomerized hydrocarbons to cracking at a temperature elevated substantially above the aforesaid isomerization temperature, whereby substantial conversion into gasoline hydrocarbons is obtained, fractionating the cracked mixture to separate fractions respectively rich in gasoline hydrocarbons and gas oil hydrocarbons, withdrawing said gasoline fraction, commingling said gas oil fraction with isomerized feed oil in the substantial absence of said isomerization catalyst and passing the commingled mixture to said cracking reaction.

4. The method according to claim 3 in which the isomerization catalyst comprises aluminum chloride and the isomerization reaction is effected at a temperature in the range about 200 to 275° F.

ARTHUR R. GOLDSBY.